(12) United States Patent
Cai et al.

(10) Patent No.: US 9,360,698 B2
(45) Date of Patent: Jun. 7, 2016

(54) DISPLAY DEVICE COMPRISING A COLOR FILTER LAYER WHEREIN A BLACK MATRIX PATTERN, A RED PIXEL PATTERN, AND A GREEN PIXEL PATTERN ARE DISPOSED IN DIFFERENT LAYERS

(71) Applicant: BEIJING BOE OPTOELECTRONICS TECHNOLOGY CO., LTD., Beijing (CN)

(72) Inventors: Peizhi Cai, Beijing (CN); Xue Dong, Beijing (CN); Xi Chen, Beijing (CN); Dong Yang, Beijing (CN)

(73) Assignee: BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 188 days.

(21) Appl. No.: 14/101,774

(22) Filed: Dec. 10, 2013

(65) Prior Publication Data

US 2014/0204319 A1    Jul. 24, 2014

(30) Foreign Application Priority Data

Jan. 22, 2013  (CN) .......................... 2013 1 0022596

(51) Int. Cl.
G02F 1/1335  (2006.01)
B82Y 20/00  (2011.01)

(52) U.S. Cl.
CPC .... *G02F 1/133514* (2013.01); *G02F 1/133516* (2013.01); *G02F 1/133617* (2013.01); *B82Y 20/00* (2013.01); *G02F 2201/08* (2013.01); *G02F 2202/107* (2013.01); *G02F 2202/36* (2013.01); *G02F 2203/34* (2013.01)

(58) Field of Classification Search
CPC ................... G02F 1/133617; G02F 2202/107; G02F 2202/36
See application file for complete search history.

(56) References Cited

U.S. PATENT DOCUMENTS

2009/0091689 A1*  4/2009  Rho ....................... C09K 11/54
                                                                 349/69
2010/0091219 A1   4/2010  Rho et al.
2011/0281388 A1  11/2011  Gough et al.
(Continued)

FOREIGN PATENT DOCUMENTS

CN     101315483 A    12/2008
CN     203084375 U     7/2013

OTHER PUBLICATIONS

First Office Action from the State Intellectual Property Office of the People's Republic of China in Chinese Patent Application No. 201310022596.0, dated Dec. 2, 2014; 11 pages.
(Continued)

*Primary Examiner* — Paul Lee
(74) *Attorney, Agent, or Firm* — Ladas & Parry LLP

(57) ABSTRACT

A display device and a manufacturing method are provided. The display device includes a blue light backlight source and a liquid crystal display panel, and the liquid crystal display panel comprises a first substrate, a second substrate. The first substrate or the second substrate includes a color filter layer which includes a black matrix pattern and a red pixel pattern and a green pixel pattern. The red pixel pattern and the green pixel pattern are quantum dot material thin film patterns respectively emitting red light and green light under the excitement of blue light.

16 Claims, 2 Drawing Sheets

(56) References Cited

U.S. PATENT DOCUMENTS

| | | | |
|---|---|---|---|
| 2012/0164429 A1* | 6/2012 | Shah | C22C 26/00 428/293.1 |
| 2012/0274882 A1 | 11/2012 | Jung | |
| 2012/0287381 A1* | 11/2012 | Li | G02F 1/133617 349/106 |
| 2013/0146834 A1* | 6/2013 | Cho | H01L 21/02521 257/9 |
| 2013/0242228 A1 | 9/2013 | Park et al. | |

OTHER PUBLICATIONS

English translation of First Office Action from the State Intellectual Property Office of the People's Republic of China in Chinese Patent Application No. 201310022596.0, dated Dec. 2, 2014; 11 pages.

English Abstract of CN101315483A; 1 page.

English Abstract of CN203084375U; 1 page.

Extended European Search Report for European Patent Application No. 14150478.7 dated Apr. 24, 2014, 11 pgs.

* cited by examiner

DISPLAY DEVICE COMPRISING A COLOR FILTER LAYER WHEREIN A BLACK MATRIX PATTERN, A RED PIXEL PATTERN, AND A GREEN PIXEL PATTERN ARE DISPOSED IN DIFFERENT LAYERS

CROSS REFERENCE TO RELATED APPLICATIONS

This application claims priority from Chinese National Application No. 20130022596.0filed on Jan. 22, 2013, the contents of which are incorporated herein by reference.

TECHNICAL FIELD

Embodiments of the present invention relates to a display device and a manufacturing method thereof.

BACKGROUND

The prior LCD display screen is to adhere a TFT substrate to a color filter substrate, as illustrated in FIG. 1, it comprises a backlight source 01 and a liquid crystal display panel 02. The liquid crystal display panel 02 comprises an upper substrate 021, a lower substrate 022 and a liquid crystal material 023. The upper substrate 021 comprises a black matrix 0201, and a red pixel region 0202, a green pixel region 0203 and a blue pixel region 0204 surrounded by black matrix patterns. A used white backlight is formed by mixing the yellow light and the blue light emitted by exciting a yttrium aluminum garnet (YAG) fluorescent powder using a blue chip, and the light emitting efficiency is low, the color is impure, and a relatively low color gamut is rendered after the filtration by the R\G\B of a color filter layer CF, and the color is not bright or real. Therefore, how to improve the performance has been a technical problem in the prior art.

The Quantum dot is generally nano particles composed of II-VI group or III-V group elements, and can emit fluorescent light after being excited. The light emitting spectrum can be controlled by varying the size of the quantum dot, and both the fluorescent intensity and the stability are fine, so it is a good photoluminescence material. There are a lot of quantum dots, and the representative ones are CdS/CdSe/CdTe/ZnO/ZnS/ZnSe/ZnTe and etc. in the II-VI group and GaAs, GaP, GaAs, GaSbi, HgS, HgSe, HgTe, InAs, InP, InSb, AlAs, AlP, AlSb and etc. in the III-V group. Quantum dots of the same material can emit different lights according to the produced size. Currently, the prior art already has the technical solution of applying quantum dot materials to a backlight source, which can improve the light emitting efficiency to a certain extent, but how to render a display device with a wide color gamut and high optical efficiency is still a technical problem in the prior art.

SUMMARY

One embodiment of the present invention provides a display device, comprising a blue light backlight source and a liquid crystal display panel, and the liquid crystal display panel comprises a first substrate, a second substrate and a liquid crystal layer between the first substrate and the second substrate, wherein the first substrate or the second substrate comprises a color filter layer which comprises a black matrix pattern and a red pixel pattern and a green pixel pattern; a first passivation layer is provided between the layer where the red pixel pattern or the green pixel pattern is located and layer where the black matrix pattern is located; a second passivation layer is provided between the layer where the red pixel pattern is located and the layer where the green pixel pattern is located; and the red pixel pattern and the green pixel pattern are quantum dot material thin film patterns respectively emitting red light and green light under the excitement of blue light.

Another embodiment of the present invention provides a manufacturing method of a display device, comprising: packaging a liquid crystal display panel and a blue light backlight source, wherein, a color filter layer is produced on the first substrate or the second substrate of the liquid crystal display panel, and steps of manufacturing the color filter layer comprise: forming a patterned black matrix pattern; forming a first passivation layer on the substrate formed with the black matrix pattern; forming a first color pixel pattern on the substrate formed with the first passivation layer; forming a second passivation layer on the substrate formed with the first color pixel pattern; forming a second color pixel pattern on the substrate formed with the second passivation layer; forming a third passivation layer on the substrate formed with the second color pixel pattern; wherein the first color pixel pattern and the second color pixel pattern are quantum dot material thin film patterns respectively emitting light of a first color and light of a second color under the excitement of blue light.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Embodiments of the present invention provide a display device and a manufacturing method thereof, for solving technical problems of narrow color gamut and low optical efficiency of the display device in the prior art.

The present invention is further described in combination with the drawings as follows.

Figure 1:
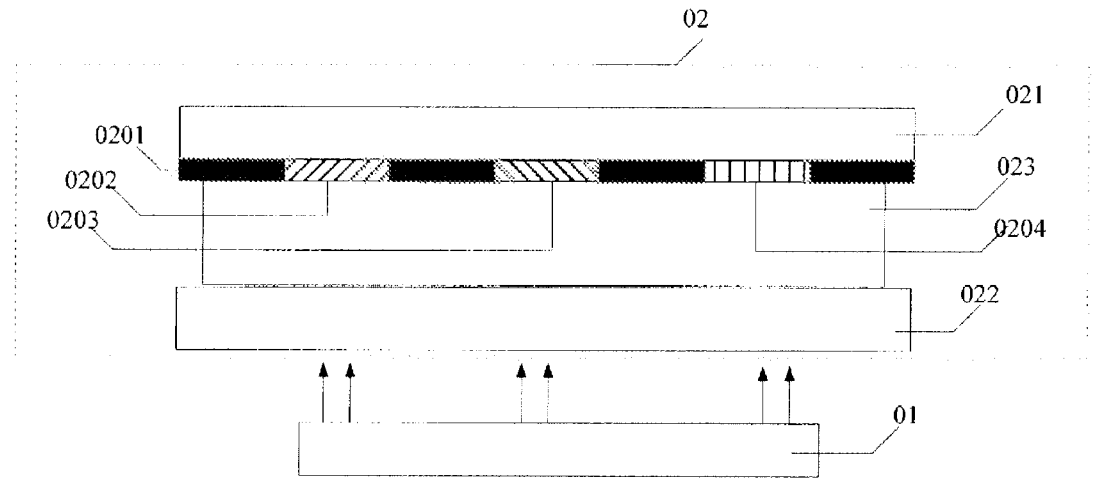
FIG. 1 is a schematic diagram of a structure of a display screen device in the prior art.
Figure 2:
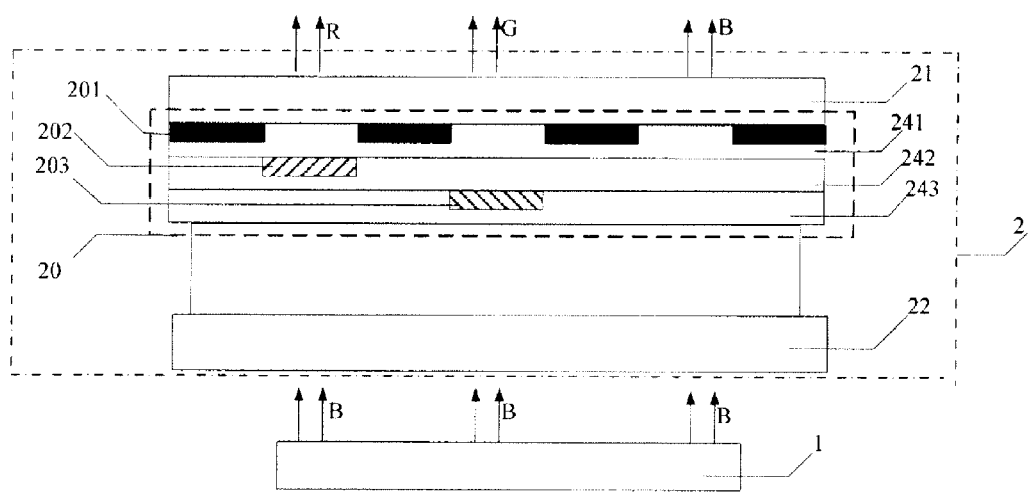
FIG. 2 is a schematic diagram of a structure of a display device provided by the embodiment of the present invention.

Referring to FIG. 2, the embodiment of the present invention provides a display device, comprising a blue light backlight source 1 and a liquid crystal display panel 2; the liquid crystal display panel comprises an upper substrate 21, a lower substrate 22 and a liquid crystal layer 23 between the upper substrate and the lower substrate. For example, the blue light backlight source 1, the lower substrate 22, the liquid crystal layer 23 and the upper substrate 21 are laminated sequentially, i.e., the blue light backlight source 1 is disposed at the lower substrate 22 side of the liquid crystal display panel.

The upper substrate 21 comprises a color filter layer 20, and the color filter layer 20 comprises a black matrix pattern 201, a red pixel pattern 202 and a green pixel pattern 203; a first passivation layer 241 is provided between the layer where the red pixel pattern 202 is located and the layer where the black matrix pattern is located; a second passivation layer 242 is provided between the layer where the red pixel pattern 202 is located and the layer where the green pattern 203 is located; and a protection layer 243 is provided above the layer where the green pixel pattern 203 is located. The red pixel pattern and the green pixel pattern are quantum dot material thin film patterns respectively emitting red light and green light under the excitement of blue light.

Figure 3:
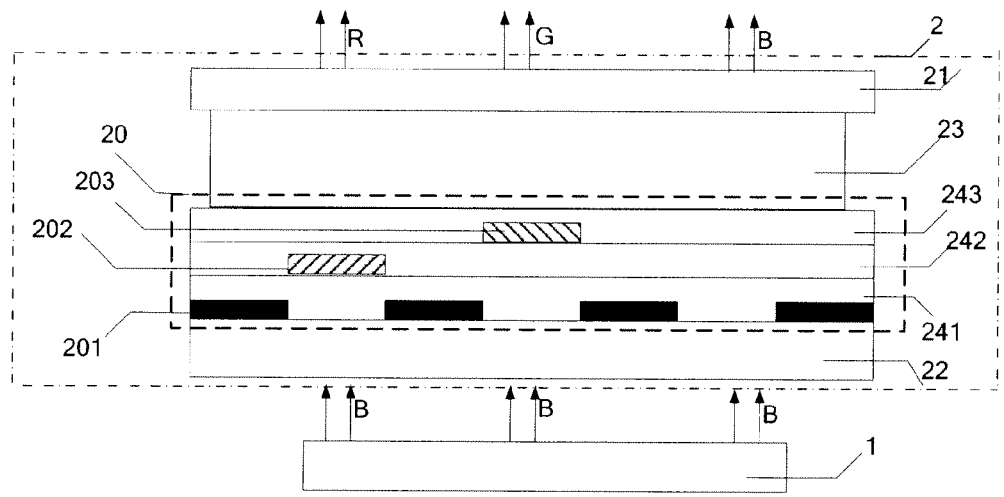
FIG. 3 is a schematic diagram of a structure of another display device provided by the embodiment of the present invention.

In another embodiment, as illustrated in FIG. 3, the lower substrate 22 comprises a color filter layer 20, and the color filter layer 20 comprises a black matrix pattern 201, a red pixel pattern 202 and a green pixel pattern 203. A first passivation layer 241 is provided between the layer where the red pixel pattern 202 is located and the layer where the black matrix pattern is located; a second passivation layer 242 is provided between the layer where the red pixel pattern 202 is located and the layer where the green pattern 203 is located; and a protection layer 243 is provided above the layer where the green pixel pattern 203 is located. The red pixel pattern and the green pixel pattern are quantum dot material thin film patterns respectively emitting red light and green light under the excitement of blue light.

The above red pixel pattern 202 and the green pixel pattern 203 are respectively provided within the pixel region defined by the black matrix to form a red pixel region and a green pixel region. In addition, the pixel region defined by the black matrix further comprises a pixel region wherein the red pixel pattern 202 and the green pixel pattern 203 are not provided, thus, the blue light emitted from the backlight source can go through the pixel region to form a blue pixel region.

The blue light is used as the backlight source, and the quantum dot material is guided into the color filter layer to provide a red pixel pattern emitting red light under excitement of the blue light and a green pixel pattern emitting green light under excitement of the green light in the color filter layer. As quantum dot material after excitement emit light with a good monochromaticity and high intensity and stability, the display screen, compared with the traditional ones, has a wider color gamut and a higher optical efficiency. Meanwhile, as the blue light is used as the backlight source, the manufacturing of the blue pixel pattern in the color filter layer is omitted, and then the process flow and the cost are reduced. On the other hand, compared with the OLED organic light emitting layer in the prior art, as the quantum dot materials are inorganic light emitting materials and can not be oxidized or eroded by moisture, it is unnecessary to conduct the manufacturing process under the protection of vacuum or inert gas, and thereby the cost is reduced and the stability and working life are improved.

For example, the upper substrate comprises an upper glass substrate and a color filter layer, and the lower substrate comprises a TFT array substrate. For example, the layer where the black matrix pattern is located is above the layer where the red pixel pattern is located and the layer the green pixel pattern is located. By adopting this structure, it is necessary to assemble the upper substrate, the lower substrate and the liquid crystal material to form the liquid crystal display panel. The assembling process flow in the prior art is mature and easily achieved.

For example, the upper substrate comprises an upper glass substrate, and the lower substrate comprises a TFT array substrate and a color filter layer. For example, the layer where the black matrix pattern is located is below the layer where the red pixel pattern is located and the layer where the green pixel pattern is located. It is unnecessary to consider the technical problem rendered by the assembling of the upper substrate and the lower substrate when disposing the color filter layer on the lower substrate. For example, the assembling process in the prior art may render a certain deviation to the device, for example, a deviation larger than 5 μm, while the process deviation in manufacturing the mask of the black matrix pattern is about 1 μm. Therefore, the technical problem of deviation caused by the assembling is omitted by disposing the color filter layer on the lower substrate, and the aperture ratio can be improved to a certain extent.

For example, a blue light filter layer is provided above the red pixel pattern and the green pixel pattern. In the technical solution provided in the present invention, the blue light backlight source is used as an excitement light source on the one hand for exciting the red pixel pattern and the green pixel pattern to respectively emit red light and green light, and on the other hand, the blue light backlight source as the light source of blue pixel, constitutes the red, green and blue three primary colors together with the red and green lights, and they are combined to conduct colorful display of a picture. Due to the limitation of the manufacturing process, there may be residual blue light emitted out after the blue light goes through the red pixel pattern and the green pixel pattern, thus a blue light filter layer is provided above the red pixel pattern and the green pixel pattern, and adopts a blue filter material. The filter material is a material which can change the spectrum components or define the oscillation plane of the light. The blue filter material can absorb light with a wavelength less than 480 nm (blue light) and transmit light with a wavelength larger than 480 nm. Therefore, after going through the red pixel pattern and the green pixel pattern, the red light and green light can be emitted out completely, while the residual blue light will be absorbed and will not appear in the red pixel pattern or the green pixel pattern regions, thus the red, green and blue three primary color pixels with very high monochromaticity can be rendered. For example, taking the N-methyl-2-pyrrole formalin and rhodanine as the raw material, a rhodanine blue light merocyanine dye is synthesized under the catalysis of piperidine and is an existing dye used by synthesis. In addition, the blue light filter layer can be provided between the upper substrate and the upper polarizer of an external layer, or at other positions, as long as it can shield the residual blue light.

For example, the blue light backlight source is an LED backlight source. Compared with other light sources, the LED used as the backlight source has a good monochromaticity and a high LED optical efficiency.

For example, the quantum dot material is a nano-particle composed by II-VI group or III-V group elements. The quantum dot material adopted by the present invention is a mature quantum dot material in the current technology, for example, the CdS/CdSe/CdTe/ZnO/ZnS/ZnSe/ZnTe and etc. in II-VI group, and the GaAs, GaP, GaAs, GaSb, HgS, HgSe, HgTe, InAs, InP, InSb, AlAs, AlP, AlSb and etc. in III-V group. For quantum dot materials of the same substance, as the sizes of the quantum dots are different, i.e., the sizes of the nano-particles are different, the lights emitted after excitement have different wavelengths. In the process of manufacturing the red pixel pattern and the green pixel pattern, materials of the same substance but with different sizes are usually used.

For example, the thin film pattern has a thickness of 10-30 nm. As the sizes of the quantum dot materials are at nano level, the efficiency of the stimulated luminescence shall be 100% if a single layer distribution of the quantum dot material can be achieved, but the single layer distribution can hardly be achieved because of the limitation of manufacturing process and costs. In the embodiment of the present invention, the thin film pattern has an appropriate thickness of 10-30 nm, and it firstly is easily achieved in the process and can ensure the optical efficiency of the emitted light.

For example, the quantum dot material is ZnS, the quantum dots of the red pixel pattern have sizes of 9-10 nm, and the quantum dots of the green pixel pattern have sizes of 7-8 nm. As described above, there are a lot of quantum dot materials, but metals such as Cd and Hg are toxic, ZnS is preferable under identical manufacturing environment. Of course, other quantum dot materials can also be used as the material of the color filter layer. Compared with ZnS, it also be fine as long as a much more strict protection measure for the production is arranged.

The embodiment of the present invention provides a manufacturing method of a display device, in which the liquid crystal display panel and the blue backlight source are packaged. A color filter layer is produced on an upper substrate or a lower substrate of liquid crystal display panel, and the method of manufacturing the color filter layer comprises:

forming a patterned black matrix pattern;

forming a first passivation layer on the substrate formed with the black matrix pattern;

forming a red pixel pattern on the substrate formed with the first passivation layer;

forming a second passivation layer on the substrate where the red pixel pattern is formed;

forming a green pixel pattern on the substrate formed with the second passivation layer;

wherein, the red pixel pattern and the green pixel pattern respectively are quantum dot material thin film patterns respectively emitting red light and green light under the excitement of blue light.

The embodiment of the present invention provides another manufacturing method of the display device, in which the liquid crystal display panel and the blue light backlight source are packaged. A color filter layer is produced on an upper substrate or a lower substrate of the liquid crystal display panel, and the method of manufacturing the color filter layer comprises:

forming a patterned black matrix pattern;

forming a first passivation layer on the substrate formed with the black matrix pattern;

forming a green pixel pattern on the substrate formed with the first passivation layer;

forming a second passivation layer on the substrate formed with the red pixel pattern;

forming a red pixel pattern on the substrate formed with the second passivation layer; and forming a third passivation layer on the substrate formed with the green pixel pattern;

wherein, the red pixel pattern and the green pixel pattern respectively are quantum dot material thin film patterns respectively emitting red light and green light under the excitement of blue light.

Furthermore, in the above manufacturing method, the steps of manufacturing the red pixel pattern and the green pixel pattern relate to the manufacturing method of the quantum dot thin film layer. There are a lot of manufacturing methods of the quantum dots, the embodiments of the present invention can use any suitable method to fabricate the quantum dots or can directly use those which are commercially available; the embodiment of the present invention can employ any suitable methods to fabricate the quantum dot thin film for the red pixel pattern and the green pixel pattern, such as spin coating. The process for fabricating the thin film may relate to a certain chemical conditions, comprising: mixing the quantum dot materials with an organic solvent and subsequently heating the organic solvent so that it can be evaporated, for example, as for the ZnS quantum dot material, the organic solvent can be absolute ethyl alcohol and etc., with a heating temperature about 100-200° C. In these chemical conditions, the already formed layers are not dissolved in the organic solvent and the manufacturing process therefore has been subjected to an annealing at 250° C., so the heating for evaporation will not affect the already formed layers.

The display panel in the display device provided by the present invention and the manufacturing method thereof will be described in details in connection with the drawings and the preferred embodiments. It is obvious that the present preferred embodiments are just for describing the invention clearly, but not a limitation to the present invention.

Figure 4:
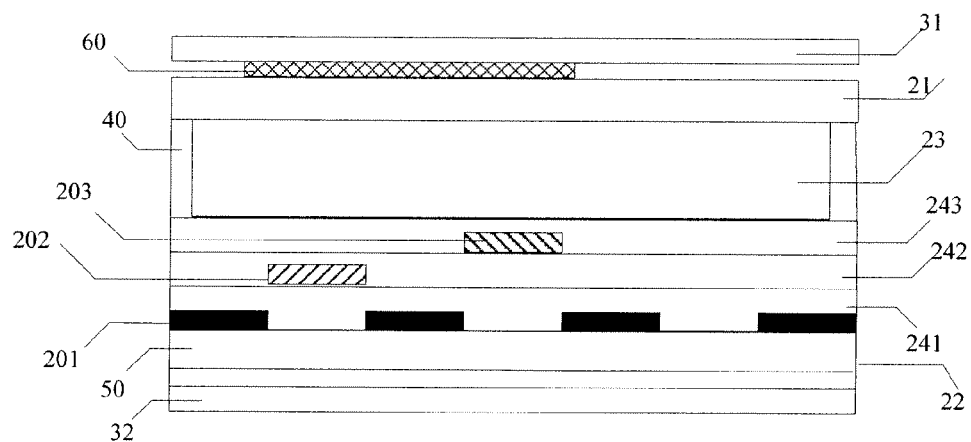
FIG. 4 is a schematic diagram of a structure of the display panel in the structure illustrated in FIG. 3.

Referring to FIG. 4, the display panel 2 in the display device in the present preferred embodiment comprises: an upper substrate 21, a lower substrate 22, a liquid crystal material 23 between the upper substrate 21 and the lower substrate 22, and a sealant 40; an upper polarizer 31 is disposed on the side of the upper substrate opposite to the liquid crystal material, and a lower polarizer 32 is disposed on the side of the lower substrate opposite to the liquid crystal material.

The upper substrate 21 is, for example, a glass substrate.

The lower substrate 22 comprises a color filter layer 20 and a TFT array substrate 50; the color filter layer 20 comprises a black matrix pattern 201, and a red pixel pattern 202 and a green pixel pattern 203; a first passivation layer 241 is disposed between the layer where the red pixel pattern 202 or the green pixel pattern 203 is located and the layer where the black matrix is located; a second passivation layer 242 is disposed between the layer where the red pixel pattern 202 is located and the layer where the green pixel pattern 203 is located; and the layer where the black matrix pattern 201 is located is below the layer where the red pixel pattern 202 is located and the layer where the green pixel pattern 203 is located. The red pixel pattern and the green pixel pattern are quantum dot thin film patterns respectively emitting red light and green light under the excitement of the blue light. It should be described herein that the upper and lower positions of the layers where the red pixel pattern and the green pixel pattern are located can be exchanged, and the object of the present invention can also be achieved.

A patterned blue light filter layer 60 is provided between the upper substrate 21 and the upper polarizer 31. In the direction perpendicular to the panel, the blue light filter layer 60 covers the red pixel pattern 202 and the green pixel pattern 203, with a function of filtering the residual blue light. In the present preferred embodiment, 5-(1-methyl-2-pyrrole methyne) rhodanine is selected as the material of the blue light filter layer.

As for the method for fabricating the TFT array substrate 50, it comprises: forming a gate line pattern on a glass substrate; manufacturing a gate insulating layer on a gate line layer; then forming drain/source electrodes and a data line layer to form the pattern of the TFT array (based on the manufacturing process, it can be divided into five processes and four processes); after the TFT is formed, forming a pixel electrode layer and an insulating layer; and lastly, forming a strip-shaped common electrode layer on the uppermost layer of the TFT array substrate.

The manufacturing method of the present preferred embodiment is described in the following. Referring to FIG. 4, firstly, a layer of the black matrix 201 designed by the pattern is produced on the TFT substrate; after the first passivation layer 241 is deposited and subjected to surface planarization, a layer of the red pixel pattern 202 is produced according to a designed pattern; then the second passivation layer 242 is deposited, and a layer of green pixel pattern 203 is produced on the second passivation layer 242 according to a designed pattern; and the third passivation layer 243 is deposited for protection. Specifically, the manufacturing process of the red pixel pattern 202 is taken as an example. The present preferred embodiment selects the ZnS quantum dot material, and the selected quantum dot material which emits red light is mixed into the organic solvent, and applied to the first passivation layer using a spin coating method, and then subjected to annealing to heat the organic solvent so that it is evaporated; and lastly a uniform red pixel pattern is formed. In the present preferred solution, the annealing temperature is selected to be 100-200° C., for example, it can be 150° C. The temperature of 250° C. will not affect the already formed layers, thus the annealing temperature in the present preferred technical solution is appropriate.

As a blue backlight is selected for direct illumination, it is unnecessary to produce the blue pixel layer. Thus, the COA (CF on Array) substrate based on the quantum dot technology is accomplished.

After a liquid crystal 23 is dripped, an upper substrate 21 with a blue light filter layer 60 is adhered; and the upper and lower substrates are respectively adhered to the upper polarizer 31 and the lower polarizer 32. Thus, the manufacturing of the liquid crystal display panel is accomplished. Then, the produced liquid crystal display panel is packaged with the backlight source to form the display device.

A blue LED backlight 1 is selected for illumination, and high-purity red light is emitted after the conversion by the red pixel pattern 202 and the filtration of the blue light filter layer 60; high-purity green light is emitted after the conversion by the green pixel pattern 203 and the filtration of the blue light filter layer 60; and the high-purity blue backlight of the backlight 1 is directly emitted, and then the R/G/B three primary colors can be rendered, and all kinds of necessary bright colors can be rendered by controlling the R/G/B gray scales with the liquid crystal layer.

To sum up, the embodiments of the present invention provide a display device and a manufacturing method, wherein the blue light is used as the backlight source, the quantum dot material is introduced into the color filter layer, a red pixel pattern which emits red light after the excitement of the blue light and a green pixel pattern which emits green light after the excitement of the blue light are respectively provided in the color filter layer; as the light emitted from the quantum dot material after excitement has good monochromaticity, and high intensity and stability, the display screen thus produced, compared with the traditional display screen, has a wider color gamut and higher optical efficiency. Meanwhile, as the blue light is adopted as the backlight source, the manufacturing of the blue pixel pattern is omitted in the color filter layer, thus the process flow and the costs are reduced. In addition, the arrangement of the blue light filter layer increases the purity of the emitted light; and as for the technical solution of manufacturing the color filter layer on the lower substrate, it is unnecessary to consider the deviation of the assembling of the color filter with the TFT array substrate, and thus a high aperture ratio is kept. The quantum dot material is an inorganic material, the manufacturing process does not need the protection of vacuum condition or inert gas, and thereby the manufacturing cost is reduced.

The foregoing is merely exemplary embodiments of the invention, but is not used to limit the protection scope of the invention. The protection scope of the invention shall be defined by the attached claims.

The invention claimed is:

1. A display device, comprising a blue light backlight source and a liquid crystal display panel, and the liquid crystal display panel comprising a first substrate, a second substrate and a liquid crystal layer between the first substrate and the second substrate, wherein,
   the first substrate or the second substrate comprises a color filter layer which comprises a black matrix pattern and a red pixel pattern and a green pixel pattern,
   wherein the black matrix pattern, the red pixel pattern and the green pixel pattern are disposed in different layers from each other;
   a first passivation layer is provided between a layer where the red pixel pattern or the green pixel pattern is located and a layer where the black matrix pattern is located;
   a second passivation layer is provided between the layer where the red pixel pattern is located and the layer where the green pixel pattern is located; and
   the red pixel pattern and the green pixel pattern are quantum dot material thin film patterns respectively emitting red light and green light under the excitement of blue light.

2. The device according to claim 1, wherein, the first substrate comprises a glass substrate and a color filter layer formed on the glass substrate, and the second substrate comprises a TFT array substrate; and the layer where the black matrix pattern is located is closer to the blue light backlight source side than the layer where the red pixel pattern is located and the layer where the green pixel pattern is located.

3. The device according to claim 1, wherein, the first substrate comprises a glass substrate, and the second substrate comprises a TFT array substrate and a color filter layer; wherein, the layer where the black matrix pattern is located is closer to the blue light backlight source side than the layer where the red pixel pattern is located and the layer where the green pixel pattern is located.

4. The device according to claim 1, wherein, a blue light filter layer is provided at sides of the red pixel pattern and the green pixel pattern opposite to the blue light backlight source.

5. The device according to claim 2, wherein, a blue light filter layer is provided at sides of the red pixel pattern and the green pixel pattern opposite to the blue light backlight source.

6. The device according to claim 3, wherein, a blue light filter layer is provided at sides of the red pixel pattern and the green pixel pattern opposite to the blue light backlight source.

7. The device according to claim 1, wherein, the blue light backlight source is an LED backlight source.

8. The device according to claim 1, wherein, the quantum dot material is a nano particle composed of II-VI group elements or III-V group elements.

9. The device according to claim 1, wherein, the quantum dot material thin film pattern has a thickness of 10-30 nm.

10. The device according to claim 1, wherein, the quantum dot material is ZnS, the quantum dot of the red pixel pattern has a size of 9-10 nm, and the quantum dot of the green pixel pattern has a size of 7-8 nm.

11. The device according to claim 1, wherein, the black matrix defines a plurality of pixel regions, and the green pixel pattern and the red pixel pattern are respectively located in different pixel regions to form a green pixel region and a red pixel region.

12. The device according to claim 11, wherein, the plurality of pixel regions further comprise a plurality of blue pixel regions in which the green pixel pattern and the red pixel pattern are not provided.

13. The device according to claim 1, wherein, the blue backlight source is provided at the second substrate side of the liquid crystal display panel.

14. The device according to claim 2, wherein, the blue backlight source is provided at the second substrate side of the liquid crystal display panel.

15. The device according to claim 3, wherein, the blue backlight source is provided at the second substrate side of the liquid crystal display panel.

16. The device according to claim 11, wherein, the blue backlight source is provided at the second substrate side of the liquid crystal display panel.

\* \* \* \* \*